United States Patent Office 2,872,370
Patented Feb. 3, 1959

2,872,370
HYPNOTIC COMPOSITION CONTAINING ABOUT 1 TO 3 PARTS ACETOPHENETIDIN AND ABOUT 3 TO 1 PARTS SALICYLAMIDE

Frank M. Berger, Princeton, N. J., assignor to Carter Products, Inc., New York, N. Y., a corporation of Maryland No Drawing. Application July 22, 1953
Serial No. 369,718

2 Claims. (Cl. 167—52)

This invention relates to hypnotic or sleep-producing drugs and has for its object the provision of an effective composition for this purpose consisting of commonly used analgesic drugs. The essential and effective active components of the composition are acetophenetidin (phenacetin, p-ethoxy acetanilide), and one of the compounds of the group consisting of salicylamide and benzamide. Acetophenetidin and salicylamide are frequently employed alone or in admixture with other active materials in the treatment of minor rheumatic pains and aches, headaches and toothaches, but have no sleep-producing properties when used alone or in such mixtures.

My invention is based on my discovery that suitable proportions of these commonly used analgesic drugs produce deep sleep without causing untoward side effects. While I prefer to form the composition of acetophenetidin and salicylamide, I may use benzamide in place of salicylamide although it is not fully as effective. A preferred composition of my invention consists essentially of acetophenetidin and salicylamide in such proportions by weight that they complement each other in convenient dose quantities, in producing sound sleep for several hours.

In the course of my extensive investigations I have made the surprising discovery that these common drugs produce an effect in combination that they are incapable of producing alone. The following compounds, which are somewhat related to acetophenetidin, when admixed with salicylamide as a substitute for acetophenetidin, produced varying degrees of sleep in animals: acetanilide (antifebran, N-phenyl acetamide), aminopyrine (amidopyrine, 4-dimethylamino-1,5-dimethyl-2-phenyl-3-pyrazolone), phenetsal (Salophen, salicylic acid ester of para acetylaminophenol), p-phenetidin (4-aminophenetole), p-aminophenol (4-amino-1-hydroxybenzene) and p-acetaminophenol (N-acetyl-p-aminophenol).

When acetophenetidin is admixed with these compounds somewhat related chemically to salicylamide, only benzamide has been found to be effective. Among the compounds which are ineffective are: meta hydroxy benzamide, para hydroxy benzamide, salicylic acid, sodium salicylate, acetyl-salicylic acid (aspirin), p-aminobenzoic acid, nicotinamide, phenetsal, methyl salicylate (wintergreen oil), phenyl salicylate (Salol), gentisic acid (2,5-hydroxy benzoic acid), o-hydroxybenzyl alcohol (salicyl alcohol, Saligenin), antipyrine and aminopyrine.

The essential components of the composition must be proportioned to result in a satisfactory sleep effect when given in conveniently proportioned doses of from 1 to 3 tablets of from around 5 to 7.5 grains each. While I may use one part of salicylamide to from 0.25 to around 4 parts of acetophenetidin, I prefer to use three parts of salicylamide to about one part of acetophenetidin.

A series of experiments were carried out on various animals including mice, rats, rabbits, and cats, but the results listed in the following tables were obtained on mice. In these experiments the compositions were injected by the introperitoneal route. This route of administration has been used because in this way absorption occurred rapidly and the results were more uniform. Mice were used because with these animals a large number can be more easily accommodated than is the case with larger laboratory animals, and the performance of tests on a larger number of animals gives more reliable results. It has, however, been shown that the compositions are also effective if given by mouth, enema, or by intramuscular or intravenous injection.

Because the presence or absence of light sleep does not lend itself to objective evaluation, it is preferred to use the presence of very deep sleep when establishing the efficiency of the compositions. During very deep sleep, the animals will tolerate a dorsal position and will remain in this position as long as the effect of the composition lasts. They will spontaneously turn over to their normal position on awakening. The duration of sleep was taken as the time commencing with the moment at which the animals tolerated being put on their backs and ending with their turning over to the normal posture.

All animals were injected with graded doses of the various compositions, the doses increasing on a logarithmic scale by a factor of 1.5. All animals were injected according to their body weights. After injection of any of the substances mentioned in doses given in the tables, no neurological deficits were observed and the animals remained normal in every respect. When higher doses than those given in the tables were injected, some neurological impairment such as ataxia or reduction of spontaneous movement was observed in some cases.

Table I which follows gives the effects of various doses of salicylamide and acetophenetidin and mixtures thereof. Doses of 280 mg./kg. of salicylamide and 420 mg./kg. of acetophenetidin, each taken alone, did not produce any symptoms. The table shows the results of using various proportions of the two drugs.

*Table I*

| Amount of Salicylamide in Dose, mg./kg. | Amount of Acetophenetidin in Dose, mg./kg. | Percent of Animals Asleep | Duration of Sleep in Minutes |
|---|---|---|---|
| 280 | 0 | 0 | 0 |
| 0 | 420 | 0 | 0 |
| 280 | 420 | 100 | 154 |
| 280 | 280 | 100 | 119 |
| 280 | 180 | 100 | 59 |
| 280 | 120 | 100 | 70 |
| 280 | 80 | 70 | 25 |
| 280 | 55 | 0 | 0 |
| 180 | 420 | 100 | 67 |
| 120 | 420 | 40 | 31 |
| 80 | 420 | 0 | 0 |

Table II which follows shows the sleep-producing action of various mixtures of acetophenetidin and salicylamide.

Table II

| | Amount of Salicylamide in Dose, mg./kg. | Amount of Acetophenetidin in Dose, mg./kg. | Total Dose, mg./kg. | 10 Mice Treated— Number of Mice Asleep | Induction | Duration± S. E. |
|---|---|---|---|---|---|---|
| Mixture 1 | 160 | 480 | 640 | 10 | 3.5 | 67.8±5.9 |
|  | 105 | 315 | 420 | 1 | 4.1 | 9.2 |
|  | 70 | 210 | 280 | 0 |  |  |
| Mixture 2 | 210 | 210 | 420 | 10 | 4.1 | 39.3±3.9 |
|  | 180 | 180 | 360 | 3 | 4.9 | 17.5±8.2 |
|  | 140 | 140 | 280 | 0 |  |  |
| Mixture 3 | 270 | 90 | 360 | 8 | 3.4 | 56.4±4.1 |
|  | 210 | 70 | 280 | 4 | 5.6 | 18.8±6.3 |
|  | 135 | 45 | 180 | 0 |  | 66 |

The mean hypnotic doses and their standard errors are for mixture 1, 490±27; for mixture 2, 372±10; for mixture 3, 300±22—all in mgm. per kgm. of body weight.

In mixture No. 1, one part of salicylamide was combined with three parts of acetophenetidin; in mixture No. 2 equal parts of both ingredients were combined; in mixture No. 3, one part of acetophenetidin was combined with three parts of salicylamide. Graded doses of each of these mixtures were injected to groups of animals and the duration of sleep with each group was observed. The probit of the percentage response was plotted against the logarithm of the dose given, and the dose effective in 50 percent of the animals read off the graph. This value was called the mean hypnotic dose or $HD_{50}$. The standard error of this dose was calculated by statistical method conventionally used. This calculation was carried out for each mixture. It was found that mixture No. 1 had an $HD_{50}$ of 490, whereas mixture No. 3 had an $HD_{50}$ of 300. Thus, mixture No. 3 is considerably more effective than mixture No. 1 because only 300 mg. per kg. of mixture No. 3 were required to put 50 percent of the animals to sleep, whereas 490 mg. per kg. of mixture No. 1 were required to obtain a similar effect.

The compositions of the invention are primarily intended for oral use and are preferably intermixed in a dry pulverulent state and formed into suitable pills, tablets or capsules by well known practices. They may also be dissolved in a suitable solvent such as water for injection or for use as enemas. It will be apparent that pills or tablets each containing but one of the two components may be formed for taking at the same time, and when such tablets are taken at the same time as a sleep-producing dose they are considered compositions of the invention.

In similar experiments compositions consisting of acetophenetidin and benzamide in similar proportions to those described above produced deep sleep but for shorter durations. While I prefer to use a simple composition consisting of acetophenetidin and salicylamide, I may also use mixtures or blends of salicylamide and benzamide with the acetophenetidin.

I claim:

1. A sleep-producing composition substantially free of stimulating agents containing as the active ingredients acetophenetidin in an amount of about 1 to about 3 parts by weight and salicylamide in an amount of about 3 to about 1 part by weight.

2. A sleep-producing composition according to claim 1 containing about three parts by weight of salicylamide and one part by weight of acetophenetidin.

References Cited in the file of this patent

UNITED STATES PATENTS 2,675,340   Pilcher et al. _____ Apr. 13, 1954

OTHER REFERENCES

Wilson et al.: Organic Chem. in Pharmacy, Lippincott, Phila., 1949, pp. 233–236, and 130.

Goodman et al.: Pharmacol. Basis of Ther., 1st ed., 1941, Macmillan Co. N. Y. C., pp. 234, 242–246.

Lasagna: J. of Pharmacol. and Exp. Ther., May 1954, pp. 9–20.

Chain Store Age, Drug Executives, Ed., vol. 28, November 1952, Sec. I, p. 75.

Brit. M. J. I (March 14, 1953), p. A–15 (advt.).

Extra Pharmacopoeia, vol. 1, 23rd ed., 1952, pp. 9, 89.

Frankel: Arzneimittel-Synthese, 1927, pp. 278 and 536.